United States Patent Office 3,334,012
Patented Aug. 1, 1967

3,334,012
DIMETHYL SULFOXIDE INHIBITION AND CONTROL OF PLANT VIRUS DISEASES
Robert J. Herschler, Camas, Wash., assignor to Crown Zellerbach Corporation, San Francisco, Calif., a corporation of Nevada
No Drawing. Filed Apr. 13, 1966, Ser. No. 542,211
6 Claims. (Cl. 167—22)

This application is a continuation-in-part of copending application Ser. No. 346,366 filed Feb. 10, 1964.

This invention relates to a method of treating plant virus diseases.

Viruses are obligate parasitic pathogens having a size less than about 200 to 300 millimicrons. Most, if not all, viruses causing plant diseases are completely systemic, that is, once they invade a host plant they move out from the point of invasion to all parts of the plant.

There are, in general, several types of virus diseases in plants. One type is the so-called mosaic diseases which cause mottling or spotting of the plant leaves, and is characterized by the production of yellowish spots or blotches and necrotic spots on the leaves. Mosaic diseases are the largest group of plant diseases. A second type of plant diseases are leaf curl and yellows. These latter diseases cause curling of leaves, yellowing, dwarfing and sometimes excessive branching of the plant. Another type which has been more recently recognized is the so-called "latent" virus diseases. This latter group of diseases is characterized by a short virulent stage, usually one season in duration, followed by a relatively non-virulent or "latent" stage wherein the plant is not visibly affected, but its vital functions are diminished by the virus.

Plant diseases are transmitted by vectors such as insects and animals, by intergrafting healthy and diseased plants, in plants which are propagated by budding, tubers, roots, shoots or other vegetative means, and, in rare instances, the virus diseases may be transmitted through seeds.

It has been estimated that as much as 10% of the value of plants raised by man every year is lost due to plant diseases of one sort or another. The virus plant diseases constitute a large portion of this loss and any method which will control plant virus diseases would be of great importance. Plants themselves to some extent have natural resistance to many plant virus pathogens. As in diseases of animals, the outcome of an infection is dependent in part upon the virulence of the pathogen and upon other factors such as invasiveness, number of infecting organisms, and portal of entry. Plant infections generally proceed through two stages: In the first stage the pathogen enters the host, and in the second stage it establishes itself and grows at the expense of the plant. The first stage may be critically affected by various morphological characteristics of the plant. In the second stage of resistance the plant has other defenses against infection. Structural properties of a plant may influence the ability of a parasite to enter or to develop in it, but the biochemical properties within the host plant which act on an invading pathogen are even more important. Many chemical components of the host cells or cellular fluids may act as deterrents to the establishment of infections. In some plants which are hypersensitive to the invading pathogen the plant reacts by necrosis at the point of entry and, since the virus pathogen are obligate they cannot further penetrate or translocate into the plant.

However, once a virus disease is established in a plant and the natural resistance of the plant has been overcome or is ineffective, the disease affects the ability of the plant to produce a harvestable crop, or it may result in terminal necrosis of the plant itself. It is, therefore, highly desirable to have some chemotherapeutic treatment which can be applied by man to infected plants to control or eradicate the course of the disease-producing pathogen.

In the past, such attempts at control of plant virus diseases have not met with great success. Sometimes, infected plants are destroyed so that the disease is not transmitted to other noninfected plants. Some plants have been heated to kill the virus but this is largely impractical. Chemotherapeutic treatments have also been tried. One of the major reasons for the lack of success of chemotherapeutic treatment has been that it is difficult to carry the chemicals employed systemically throughout the plant to all the locations where the virus is located. Also, most of the recognized chemotherapetutic agents are phytotoxic.

In copending application Ser. No. 344,558 filed Feb. 13, 1964, now abandoned, there is described a method for penetrating and/or translocating virucides into the vascular system of plants by the use of dimethyl sulfoxide. The present invention is related to the use of dimethyl sulfoxide itself as a chemotherapeutic agent. By "chemotherapetutic" it is intended to include both the virucidal and virustatic action of dimethyl sulfoxide itself and/or the action of dimethyl sulfoxide in inducing virucidal or virustatic action by the plant itself.

It is an object of this invention therefore to provide a method of treating plant virus diseases by the use of a chemotherapetutically-active agent which enters the plant's vascular system and is systemically carried throughout the plant to all parts thereof and which is effective in controlling viruses.

By the word "control" it is intended to mean both the complete inhibition of further viral growth and also the temporary inhibition of viral growth.

It has been found that plant virus diseases may be controled by contacting the plant with an effective amount of dimethyl sulfoxide. The growth of plant viruses is stopped or markedly reduced by such contact.

By the phrase "contacting plants" it is intended to mean both external contact as with a spray, mist or bark paint, and internal contact as with injections into the plant xylem. It has been found that with external contact of plants with dimethyl sulfoxide, the latter has the extraordinary property of penetrating the outer layers of the plant parts contacted and moving into the plant where it is translocated systemically, i.e., throughout the vascular system of the plant. With internal contact by xylem injection the penetration of the outer layers is effected mechanically, and the dimethyl sulfoxide is then translocated systemically from the point of injection, although it is possible that some further penetration from the point of injection may be necessary for entry into the vascular system.

The types of plants that may be effectively treated by the method described herein do not appear to be limited and the treatment is applicable to both broad leaf and narrow leaf plants, deciduous and coniferous, annual and perennial. Exemplary of such plants are grasses, cereals, vegetables, flowers, vines, fruit trees, citrus trees, shade trees, forest land trees, herbaceous plants, shrubs, etc.

The virus diseases that may be effectively treated by the method described herein include mosaic, leaf curl and yellows.

Exemplary of mosaic virus diseases that may be treated are:

Squash mosaic
Cucumber mosaic
Tobacco mosaic
Masked tobacco mosaic
Alfalfa mosaic
Peach mosaic
Tomato Aucuba mosaic Tomato enation mosaic
Turnip yellow mosaic
Southern bean mosaic
Prunus ringspot
Tobacco ringspot
Potato virus Y
Potato virus X, Strains S and Y
Cucumber 3 and 4
Ribgrass mosaic
Soybean mosaic
Pea mosaic
Tulip mosaic
Tomato spotted wilt Exemplary of leaf curl and yellow virus diseases that may be treated are:

Tomato bushy stunt
Strawberry stunt
Sugar beet curly top
Peach yellows
Sugarbeet yellows Other plant virus diseases, such as latent virus diseases, may also be effectively treated with dimethyl sulfoxide.

The dimethyl sulfoxide may be contacted with the plants as an aqueous solution or in an inert carrier, such as a soluble oil. The aqueous solution is preferred, however.

If the mode of contact is by xylem injection, it is sometimes desirable to incorporate acetone into the solution. The latter acts as an antifreeze, which is needed if low temperatures are involved, as dimethyl sulfoxide freezes at 68° F.

The concentration of dimethyl sulfoxide employed, which constitutes an "effective amount," will depend upon the type and size of the plant involved, the stage of development from the emergent period for deciduous plants, and the mode of contact. Concentrations of dimethyl sulfoxide as high as about 100% in weight are tolerated by conifers, but for tender deciduous and herbaceous plants, lesser concentrations of less than about 25% are preferred. Concentrations as high as 100% by weight may be employed where the contact is effected by bark paint, but concentrations as low as being in the parts per million range may be preferred for drench or other heavy applications. For spray application, 2% by weight is a good starting point. It should be noted, however, that these figures are not absolute for any particular plant or mode of contact, but rather are given to serve as guidelines as the identity of the plant, its size, the stage of development of its leaves, and the mode of application must all be considered in determining the optimum concentration to employ. The term "effective amount" therefore is intended to mean an amount of dimethyl sulfoxide which is effective, for a particular plant and mode of application, to control a particular virus disease, but insufficient to cause undue phytotoxicity.

It has been noted that it is more desirable to effect the treatment during non-dormancy. Application during the dormant period is also feasible however.

The number and frequency of application of dimethyl sulfoxide to plants again depends upon the many factors enumerated before. Generally speaking, however, application at intervals of 14–28 days during the growing season is satisfactory.

The exact mechanism whereby the growth of plant viruses in inhibited is not known. There are several possible explanations which will be set forth herein but it is to be understood that these are hypotheses only and are not limiting or binding in any manner. As mentioned before, there are many chemical constituents of the host cells or cellular fluids in plants which act as deterrents in the establishment of infections. Among resistance-affecting compounds found in some plants are protocatechuic acid and catechol and various other organic acids or their esters, as well as tannins and alkaloids. The introduction of dimethyl sulfoxide into the vascular system of plants affected by virus diseases may stimulate the production of some or all these materials in a particular plant or, it may potentiate the effectiveness of these materials against the virus, or it may affect the virus itself in some way to make it more susceptible to attack by these chemicals. Other possibilities are that the plant fluids or other components within the plant may modify the dimethyl sulfoxide in some way so as to produce an intiviral agent. Another possibility is that the dimethyl sulfoxide stimulates or triggers the production in the plant of an antiviral agent which the plant does not normally produce.

The following examples are presented to illustrate various embodiments of the invention, but it is to be understood that they are not intended to represent an exclusive teaching.

EXAMPLE 1

*Control of stony pit virus in pear trees*

Six pear trees were uniformly infected with a virus causing pear fruit malformation termed "Stony Pit." The fruit of these trees was graded and found to bear more than 95% infected fruit. Such fruit shows at least one visible surface blemish with pitting.

The trees were treated by directly injecting 100 ml. of liquid into the xylem under a hydrostatic head of 4 feet to force in the liquid. The total amount of liquid was injected in 24 hours or less, once per month in two consecutive annual growing seasons of April to October. A first group of 2 trees was a control and received 100 ml. of water. A second group of 2 trees received 50 ml. of water and 50 ml. of dimethyl sulfoxide, and a third group of 2 trees received 75 ml. of water and 25 ml. of dimethyl sulfoxide.

After the first annual growing season, there was considerable symptomatic relief of the second group on 50% dimethyl sulfoxide, and only minor relief with the third group receiving 25% dimethyl sulfoxide.

After the second annual growing season, more than 95% of the fruit in the first or control group was pitted and deformed, only 4.5% of the fruit in the second group on 50% dimethyl sulfoxide, and 47% in the third group on 25% dimethyl sulfoxide showed signs of malformation.

EXAMPLE 2

*Control of leaf mosaic*

Strawberry plants free of virus signs were artificially infected with a virus causing the disease strawberry leaf mosaic. A known antiviral agent, 6-mercaptopurine, and dimethyl sulfoxide were administered separately under controlled conditions. Applications of the liquids were made to three groups of three plants per group with an air-powered de Vilbis sprayer, the aerial portions of the plants being sprayed until runoff, as follows:

(1) 500 p.p.m. of 6-mercaptopurine (in 10/90 ethanol/water);
(2) 500 p.p.m. dimethyl sulfoxide (in water);
(3) Control of 10/90 ethanol/water.

In control group number 3 the virus signs were seen in 3–4 days. With groups number 1 and number 2, the virus signs were controlled for 1 week.

EXAMPLE 3

*Control of virus growth*

Tobacco mosaic virus (TMV) suspensions of high titer were treated with solutions of 1%, 2%, 5% and 25% aqueous dimethyl sulfoxide (DMSO). A control suspension was not treated with DMSO. The control and test plants were inoculated with the aid of air-propelled carborundum particles. The control plant produced a high number of necrotic lesions, 479 per leaf when read 5 days after inoculation. TMV suspensions treated with dimethyl sulfoxide produced fewer discrete lesions per leaf, the number of lesions descreasing with higher dimethyl sulfoxide concentrations up to the 25% concentration; with 25% DMSO there was sufficient phytotoxicity to void testing. The results are summarized in the following table:

| TMV suspensions: | number of lesions |
|---|---|
| Control (no DMSO) | 479 |
| 1% DMSO | 283 |
| 2% DMSO | 170 |
| 5% DMSO | 169 |
| 25% DMSO, Phytotoxicity. | |

It is seen that increasing concentrations of DMSO in water reduced the discrete lesion count. Results probably indicate virustatic, not virucidal action.

EXAMPLE 4

*Control of peach mosaic and prunes ringspot in peach trees*

A series of 3-year-old peach trees were treated as follows:

300 ml. of liquid was injected into the trunks of paired trees at a point about 12 inches above the soil level. The liquid injected consisted of distilled water in some of the trees to serve as a control, and in other paired trees dimethyl sulfoxide having the following concentrations was injected: 0.01 M, 0.05 M, 0.1 M, 0.5 M, and 1.0 M.

All of the trees injected with dimethyl sulfoxide showed some marginal leaf burn and terminal die-back but, except for those injected with the 1.0 M dimetayl sulfoxide recovery was rapid. Some of the trees injected with a concentration of 1.0 M dimethyl sulfoxide recovered but others did not. One-half of each of the paired trees was graft-inoculated with a culture of peach mosaic virus; the other half was inoculated with a culture of prunus ringspot virus. All inoculations were made at full bloom. The injection of dimethyl sulfoxide and distilled water was made at two periods of growth:

(1) During dormancy, usually about 3 weeks before bud swell; and
(2) At full leaf.

Control trees were treated as follows:

(1) Uninoculated and noninjected;
(2) Uninoculated and injected with distilled water;
(3) Inoculated and noninjected; and
(4) Inoculated and injected with distilled water.

During the course of the experiment it was found that injection of distilled water did not affect the occurrence of nonoccurrence of disease symptoms as all the inoculated controls developed disease symptoms and all the uninoculated controls remained healthy. Disease symptoms of both peach mosaic and prunus ringspot appeared in trees that had been injected with dimethyl sulfoxide during dormancy, but in those trees injected at full leaf absolutely to disease symptoms appeared at any DMSO concentration.

EXAMPLE 5

*Control of bitter pit*

Jonathan apple trees affected with bitter pit (which may or may not be caused by a virus) were treated at 30-day intervals with 100 p.p.m. dimethyl sulfoxide applied as a spray. A control tree received no treatment. At the end of the growing season the percent pit of the fruit of the control tree was 14.82 and its scald index was 10.61. The tree treated with dimethyl sulfoxide had a percent pit of 7.52 and a scald index of 7.91.

EXAMPLE 6

*Control of latent virus*

Seven greenhouse-grown Eureka lemon trees were infected with a latent virus, which had exhibited itself by exacerbation two years previous. Four of these trees were treated with an xylem injection of 50% by weight DMSO in water. The three other trees were held as controls and ont treated. Within 5 to 7 days after DMSO injection, the treated trees produced vigorous new growth with some growth leaders eventually extending 10 to 12 inches. The control trees developed no new growth for 25 to 30 days and then produced only weak growth leaders which eventually reached 3 to 4 inches in length, and which were chlorotic.

From the foregoing description it is sceen that a method has been disclosed whereby plant virus diseases may be controlled by contacting the diseased plant with an effective amount of dimethyl sulfoxide.

In the foregoing specification the various specific examples of materials, procedures and uses are intended to be illustrative only and not limiting as there are many variations which will occur to those having ordinary skill in the art and which are intended to be included within the scope of the following claims.

I claim:

1. A method of controlling plant virus diseases comprising contacting a plant affected by a virus disease with a virus-inhibiting amount of dimethyl sulfoxide, said virus-inhibiting amount being insufficient to cause undue phytotoxicity.

2. The method of claim 1 wherein the plant virus disease is selected from the group consisting of mosaic, leaf curl and yellows, and latent virus diseases.

3. The method of claim 1 wherein the dimethyl sulfoxide is applied by xylem injection.

4. The method of claim 1 wherein the dimethyl sulfoxide is applied by soil drench.

5. The method of claim 1 wherein the dimethyl sulfoxide is applied topically to the outside of the plant.

6. The method of claim 5 wherein the dimethyl sulfoxide is applied as a spray of an aqueous solution containing about 2% by weight dimethyl sulfoxide.

References Cited

UNITED STATES PATENTS

| 2,654,667 | 10/1953 | Goodhue et al. | 71—2.3 |
| 2,957,799 | 10/1960 | Goodhue et al. | 167—22 |
| 3,147,582 | 6/1964 | Szczesniak | 99—192 |
| 3,177,140 | 4/1965 | Herschler | 210—64 |

OTHER REFERENCES

Crown Zellerbach Product Information Bulletin, "Dimethyl Sulfoxide (DMSO) Pesticide Solvent," (5 pp.) August 1961, revised May 1963 (7 pp.).

Farm Journal 88(2):54, February 1964.

LEWIS GOTTS, *Primary Examiner.*

S. K. ROSE, *Assistant Examiner.*